United States Patent
Yokoya et al.

(10) Patent No.: US 6,461,139 B1
(45) Date of Patent: Oct. 8, 2002

(54) PRESSURE DETECTION APPARATUS OF INJECTION MOLDING MACHINE

(75) Inventors: Kinji Yokoya; Hiroshi Yamaura; Keizou Shimizu, all of Nagano (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 139 days.

(21) Appl. No.: 09/667,594

(22) Filed: Sep. 22, 2000

(30) Foreign Application Priority Data

Sep. 22, 1999 (JP) .......................................... 11-269327

(51) Int. Cl.[7] .............................................. B29C 45/77
(52) U.S. Cl. ...................... 425/149; 425/150; 425/170; 425/574
(58) Field of Search ................................ 425/149, 150, 425/574, 170

(56) References Cited

U.S. PATENT DOCUMENTS

| | | | |
|---|---|---|---|
| 5,023,028 A | * 6/1991 | Kamiguchi et al. | 264/40.1 |
| 5,251,146 A | * 10/1993 | Neko et al. | 700/203 |
| 5,336,073 A | * 8/1994 | Hiraoka | 425/145 |
| 5,380,181 A | * 1/1995 | Hiraoka et al. | 425/145 |

FOREIGN PATENT DOCUMENTS

| | | |
|---|---|---|
| JP | 82567 | 1/1996 |
| JP | 10151653 | 6/1998 |

* cited by examiner

Primary Examiner—Jan H. Silbaugh
Assistant Examiner—Joseph S Del Sole
(74) Attorney, Agent, or Firm—Birch, Stewart, Kolasch & Birch, LLP

(57) ABSTRACT

A pressure detection apparatus of an injection molding machine composed of a drive mechanism and a movable member includes a pressure reception member disposed in the drive mechanism in such a manner as to be movable in a reciprocating direction of the movable member while being guided by a guide member. A ball screw or nut of a ball screw mechanism of the drive mechanism is fixedly attached to the pressure reception member. A load cell is disposed between the drive mechanism and the movable member in such a way as to be fixedly attached to one of a bearing ring retainer facing the movable member and the pressure reception member while abutting the other. The pressure reception member receives stress (load) directed in a rotation direction and arising from the ball screw or nut, thereby preventing imposition of the stress (load) on the load cell.

4 Claims, 6 Drawing Sheets

PRESSURE DETECTION APPARATUS OF INJECTION MOLDING MACHINE

BACKGROUND OF THE INVENTION

1. Field of the Invention

The present invention relates to a pressure detection apparatus of an injection molding machine for detecting pressure by means of a load cell disposed between a movable member, such as a screw, and a drive mechanism.

2. Description of the Relevant Art

Japanese Patent Publication (kokoku) No. 8(1996)-2567 and Japanese Patent Application Laid-Open (kokai) No. 10(1998)-151653 disclose a conventional pressure detection apparatus of an injection molding machine for detecting pressure by means of a load cell disposed between a drive mechanism, which includes a drive motor and a ball screw mechanism, and a screw, which is driven in a reciprocating manner by the drive mechanism.

In such a pressure detection apparatus, one end face of a load cell is fixedly attached to a screw support member for supporting a screw, whereas the other end face of the load cell is fixedly attached to a ball screw or nut of a ball screw mechanism, thereby detecting pressure imposed between the screw support member and the ball screw or nut.

The above-mentioned pressure detection apparatus of an injection molding machine involves the following problems.

First, since the load cell is fixedly attached to both the screw support member and the ball screw mechanism by means of screws, the ball screw or nut imposes stress (load) directed in a rotational direction directly on the load cell, resulting in a failure to detect only thrust pressure at high accuracy.

Second, since the load cell also serves as a connection member for connecting the screw support member and the ball screw mechanism, impairment in the load cell (shortening of life of the load cell) is accelerated.

Third, since a value of detection by the load cell varies with, for example, temperature drift, reset-to-zero is usually performed while no pressure is imposed. However, since the load cell is fixedly attached to both the screw support member and the ball screw mechanism, imposed pressure cannot be released completely to zero, resulting in a failure to perform reset-to-zero accurately.

SUMMARY OF THE INVENTION

An object of the present invention is to provide a pressure detection apparatus of an injection molding machine capable of detecting only thrust pressure at high accuracy through prevention of imposition of stress (load) directed in a rotational direction on a load cell from a ball screw mechanism.

Another object of the present invention is to provide a pressure detection apparatus of an injection molding machine capable of lengthening life of a load cell through prevention of imposition of unnecessary stress on the load cell.

To achieve the above objects, the present invention provides a pressure detection apparatus of an injection molding machine comprising a drive mechanism, which in turn comprises a drive motor and a ball screw mechanism, and a movable member, such as a screw, which is moved in a reciprocating manner by the drive mechanism. The pressure detection apparatus comprises a pressure reception member disposed in the drive mechanism in such a manner as to be movable in a reciprocating direction of the movable member while being guided by a guide member, a ball screw or nut of the ball screw mechanism being fixedly attached to the pressure reception member; and a load cell disposed between the drive mechanism and the movable member in such a manner as to be fixedly attached to one of the movable member and the pressure reception member while abutting the other.

Thus, one of the movable member and the pressure reception member merely abuts the load cell, while the pressure reception member bears stress (load) directed in a rotational direction and imposed from the ball screw or nut of the ball screw mechanism. Thus, only thrust pressure is imposed on the load cell.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the configuration of an injection molding machine M equipped with a pressure detection apparatus 1 according to the present embodiment will be described with reference to FIGS. 1 to 7.

Figure 1:
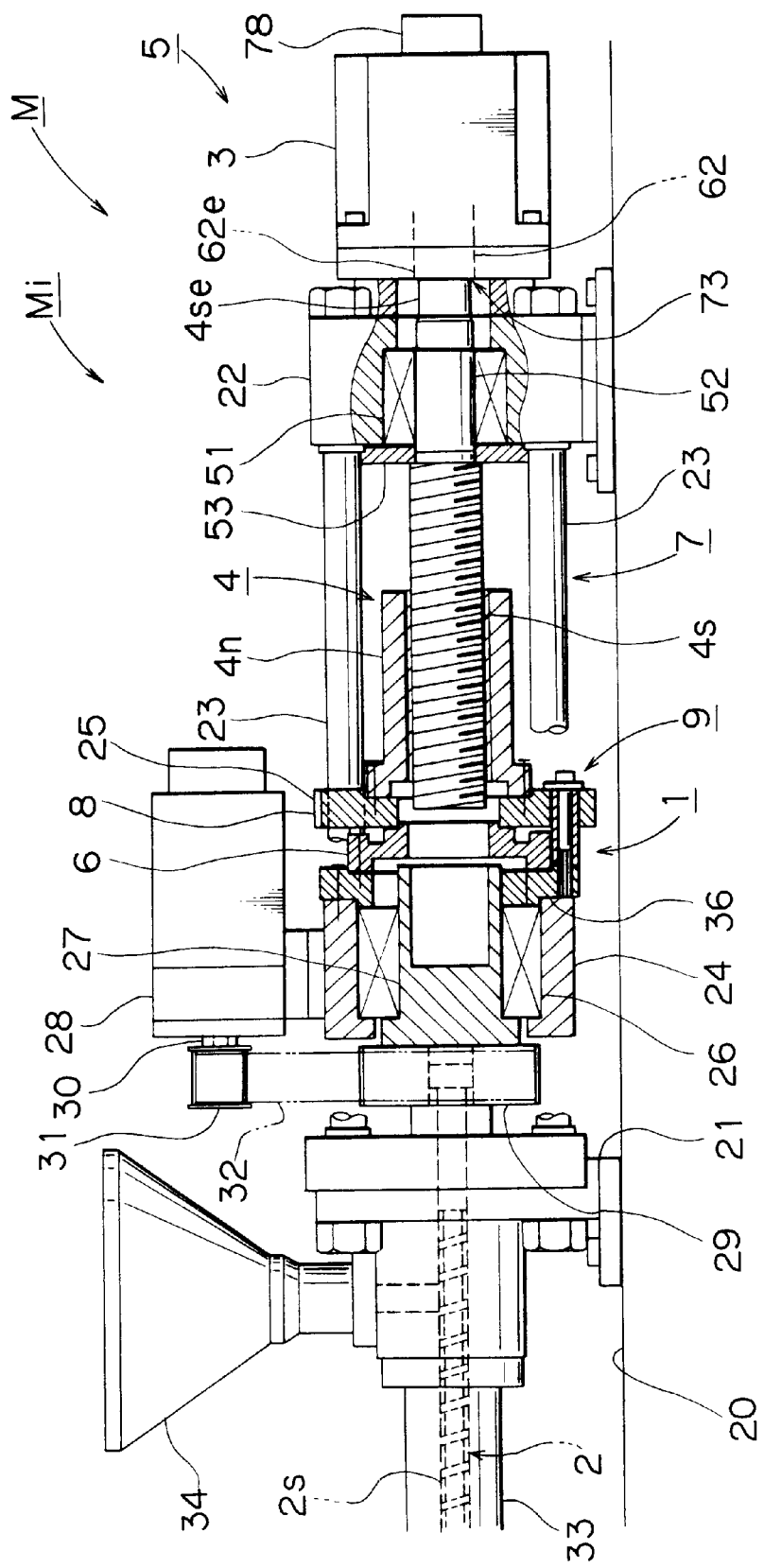
FIG. 1 is a partially sectional side view of an injection unit of an injection molding machine, equipped with a pressure detection apparatus according to an embodiment of the present invention.
Figure 2:
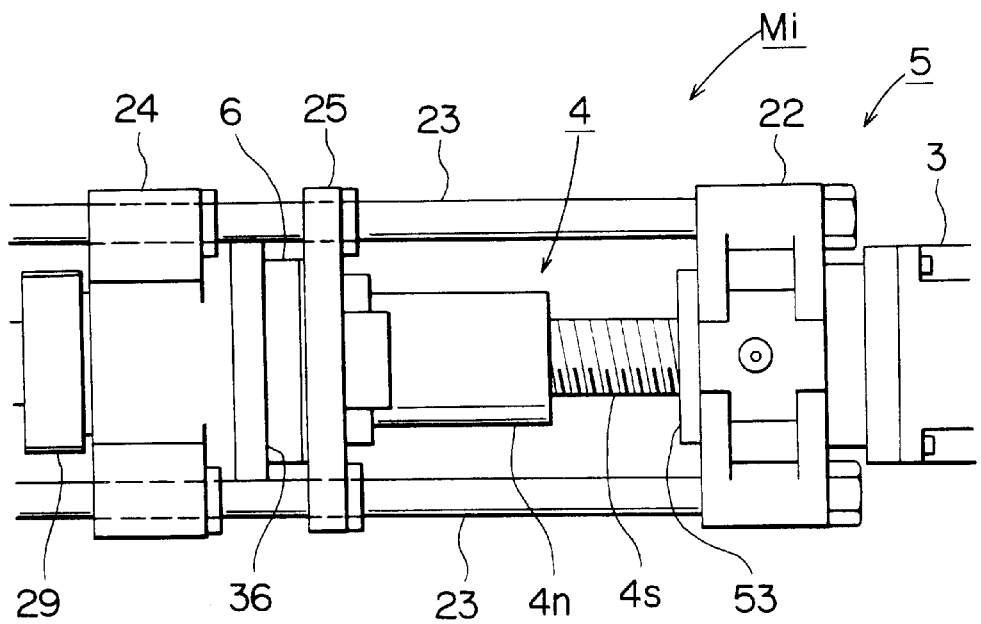
FIG. 2 is a plan view showing a portion of the injection unit.
Figure 3:
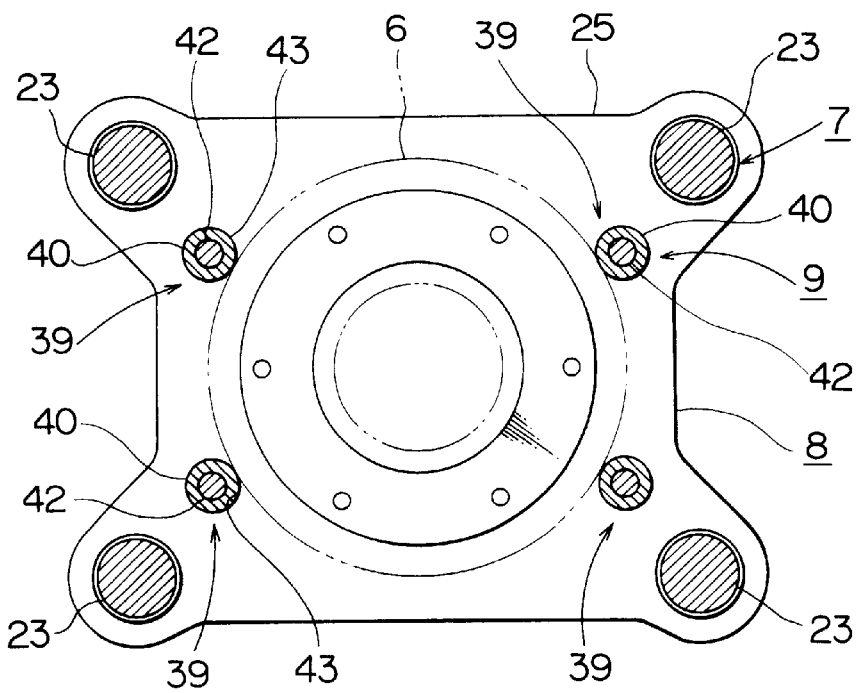
FIG. 3 is a rear view of a pressure reception member (rear slider) disposed in the pressure detection apparatus.

FIG. 1 shows an injection unit M1 of the injection molding machine M. In FIG. 1, reference numeral 20 denotes a machine base. An injection base 21 and an injection drive base 22 are mounted apart from each other on the machine base 20. Four guide shafts 23 (see FIG. 3) extend between the injection base 21 and the injection drive base 22, thereby forming a guide member 7. A front slider 24 and a rear slider 25 are slidably mounted on the guide shafts 23 (see FIG. 2). The rear slider 25 is formed from the front slider 24 and serves as a pressure reception member 8.

The front slider 24 has a hollow portion formed therein, thereby assuming the form of a cylinder. A bearing 26 is disposed within the hollow portion so as to rotatably support a screw coupling 27. A servomotor 28 for measuring use is disposed on the top surface of the front slider 24. A toothed driven pulley 29 is attached to the front end of the screw coupling 27. A toothed drive pulley 31 is attached to a rotor shaft 30 of the servomotor 28. A timing belt 32 is looped around and extends between the toothed driven pulley 29 and the toothed drive pulley 31, thereby forming a rotation transmission mechanism. The rear end of a heating cylinder 33 is attached to the front end face of the injection base 21. The heating cylinder 33 is equipped with a hopper 34 disposed at the rear portion of the heating cylinder 33. A screw 2s (movable member 2) extends through the heating cylinder 33. The rear end of the screw 2s is connected to the center of the screw coupling 27 (toothed driven pulley 29).

Figure 4:
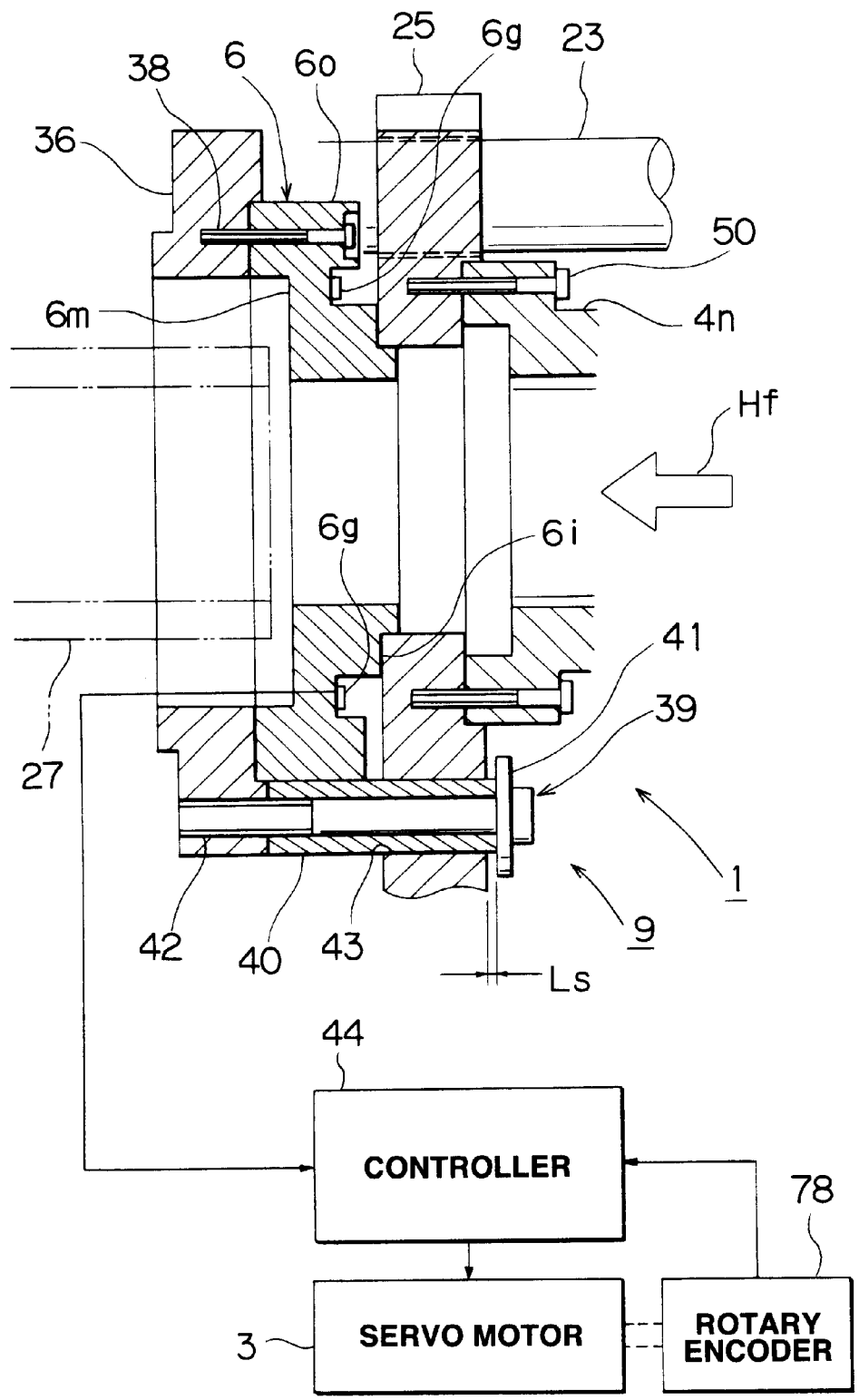
FIG. 4 is a sectional side view of the pressure detection apparatus.
Figure 5:
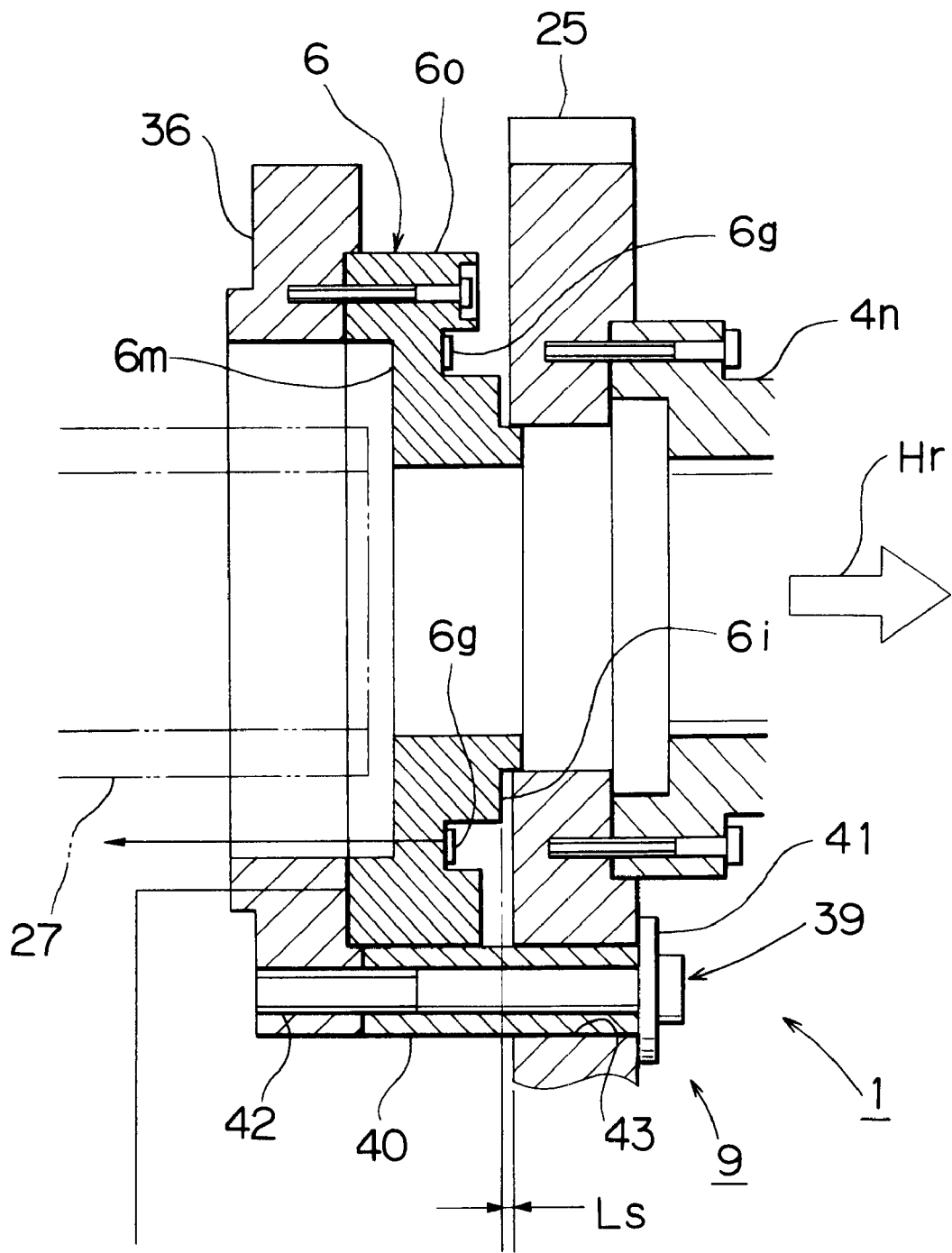
FIG. 5 is a sectional side view of the pressure detection apparatus as viewed when a drive mechanism is controlled to perform a retreat operation.

A bearing retainer ring 36 is attached to the rear end of the front slider 24. As shown in FIG. 4, an outer ring portion 6o of the load cell 6 is fixedly attached to the rear end face of the bearing retainer ring 36 by means of a plurality of screws 38. Four stoppers 39, which constitute a restraining mechanism 9, are attached to the bearing retainer ring 36 so as to restrain movement of the rear slider 25. The stoppers 39 do not contact the load cell 6. Each of the stoppers 39 includes a guide pipe 40 having a predetermined length; a stopper ring 41 located at an end of the guide pipe 40; and a screw 42 extending through the guide pipe 40 and the stopper ring 41 and screwed into the bearing retainer ring 36. The guide pipes 40 extend through the corresponding guide holes 43 formed in the rear slider 25, thereby guiding the rear slider 25 slidably (see FIG. 3). The length of the guide pipe 40 is selected such that the rear slider 25 can make a relative displacement with respect to the load cell 6 by a predetermined stroke Ls in the reciprocating direction of the screw 2s. This stroke Ls may be as small as releasing the rear slider 25 from contact with the load cell 6 when the rear slider 25 is displaced rearward. Thus, when the rear slider 25 moves forward, the front end face thereof abuts an inner ring portion 6i of the load cell 6. When the rear slider 25 moves rearward, rearward displacement beyond the stroke Ls is restrained by the stopper rings 41. The load cell 6 includes a relatively thin-walled intermediate strain generation portion 6m formed integrally between the inner ring portion 6i and the outer ring portion 6o. A plurality of strain gauges 6g are disposed on the intermediate strain generation portion 6m and are connected to the input side of a controller 44.

The front end face of a nut 4n of the ball screw mechanism 4 is fixedly attached to the rear end face of the rear slider 25 by means of a plurality of screws 50. The injection drive base 22 has a hollow portion formed therein. A bearing 51 is disposed within the hollow portion so as to rotatably support a rear-end shaft portion 52 of the ball screw 4s of the ball screw mechanism 4. Reference numeral 53 denotes a bearing retainer ring fixedly attached to the front end face of the injection drive base 22.

Figure 6:
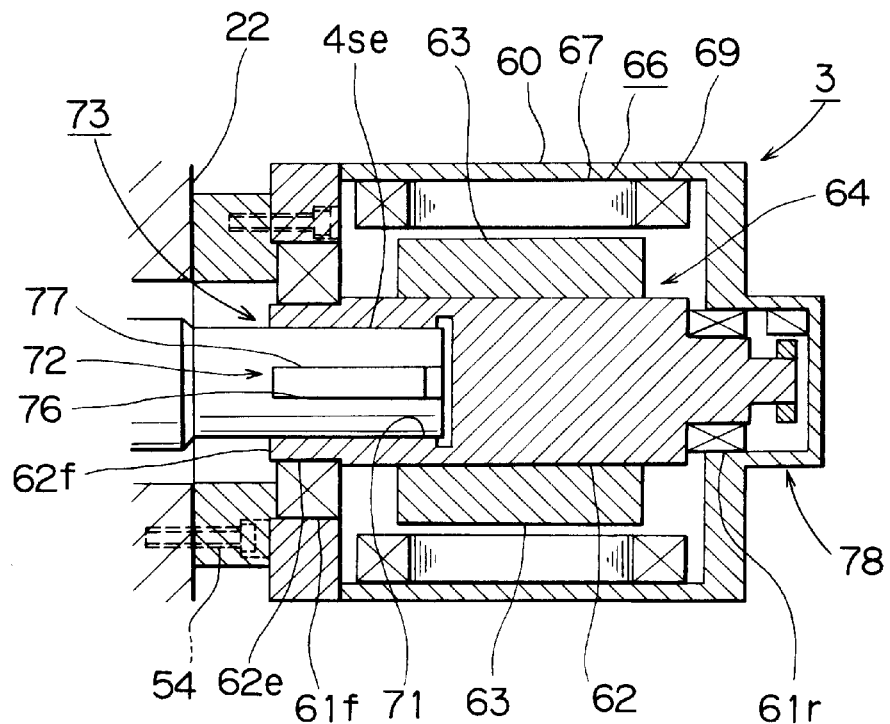
FIG. 6 is a schematically sectional side view of a servomotor used in the injection unit.

A servomotor (drive motor) 3 for injection use is fixedly attached to the rear end face of the injection drive base 22 by means of a plurality of screws 54. As shown in FIG. 6, the servomotor 3 includes a casing 60 of a non-magnetic material, forward and rearward bearings 61f and 61r disposed within the casing 60, and a rotor shaft 62 of a non-magnetic material supported rotatably by the bearings 61f and 61r. Four magnets 63 are fixedly attached to the circumferential surface of the rotor shaft 62 while being spaced equally in the circumferential direction, thereby constituting a rotor (magnet rotor) 64 (see FIG. 7). The type and size of the magnet 63 are selected so as to obtain the highest magnetic flux density. Reference numeral 65 denotes a spacer disposed between the magnets 63.

A stator 66 is disposed on the inner circumferential surface of the casing 60 in such a manner as to face the rotor 64. The stator 66 includes a yoke member 67 formed through lamination of a number of annular silicon steel plates into the form of a cylinder. The yoke member 67 includes a number of core portions 68 formed on the inner side thereof. The core portions 68 are arranged at circumferentially constant pitches. A stator coil 69 is wound around (attached to) each of the core portions 68. The number of core portions 68 (the number of slots) is preferably not less than 36 so as to realize, in cooperation with high magnetic flux density effected by the magnets 63, a synchronous AC servomotor which outputs low-speed high-torque revolutions. As shown in FIG. 4, the servomotor 3 is connected to the output side of the controller 44.

Figure 7:
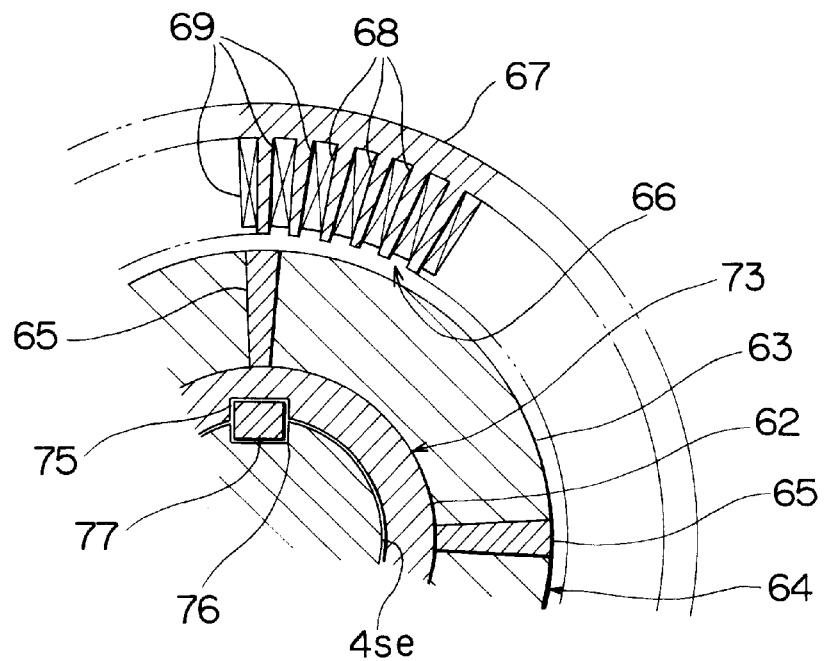
FIG. 7 is a schematically sectional front view showing a portion of the servomotor of FIG. 6.

As shown in FIG. 6, a front end portion 62e of the rotor shaft 62 and a rear end portion 4se of the ball screw 4s (rear-end shaft portion 52) of the ball screw mechanism 4 are directly coupled, thereby forming a direct coupling structure 73. More specifically, the rear end portion 4se of the ball screw 4s is inserted into a recess 71 formed in the rotor shaft 62 and extending axially from an end face 62f of the rotor shaft 62, while a shaft restraining mechanism 72 prevents rotation of the ball screw 4s with respect to the rotor shaft 62. As shown in FIG. 7, the shaft restraining mechanism 72 includes a groove 75 formed axially on the inner wall surface of the recess 71; a groove 76 formed axially on the circumferential surface of the rear end portion 4se; and a parallel pin 77 fitted into both the groove 75 and the groove 76. The thus-formed direct coupling structure 73 has an advantage in that the size thereof does not exceed the outer diameter of the rotor shaft 62. The servomotor 3 and the ball screw mechanism 4 constitute a drive mechanism 5 for advancing/retreating the screw 2s.

Thus, rotation of the servomotor 3 is directly transmitted to the ball screw 4s of the ball screw mechanism 4. Since a rotation transmission mechanism having a timing belt is not involved, the injection molding machine M can be compact and quiet. Also, since rigidity is enhanced, the control gain (control constant) can be increased, thereby enhancing stability of control.

A rotary encoder 78 is attached to the rear end face of the casing 60 in order to detect the number of revolutions (rotational speed) of the rotor 64. In order to accurately detect the rotational speed of the rotor 64 even when the rotor 64 is rotating at low speed, the rotary encoder 78 is configured so as to exhibit high resolution; i.e., to produce as many pulses as possible per revolution of the rotor 64.

The above-described configuration includes the pressure detection apparatus 1 according to the present embodiment, which apparatus 1 in turn includes the rear slider 25 and the load cell 6. The rear slider 25 is disposed in the drive mechanism 5 in such a manner as to be movable in a reciprocating direction of the screw 2s while being guided by the guide shafts 23. The nut 4n of the ball screw mechanism 4 is fixedly attached to the rear slider 25. The load cell 6 is fixedly attached to the bearing retainer ring 36, which is located on the screw 2s side, while abutting the rear slider 25.

Figure 8:
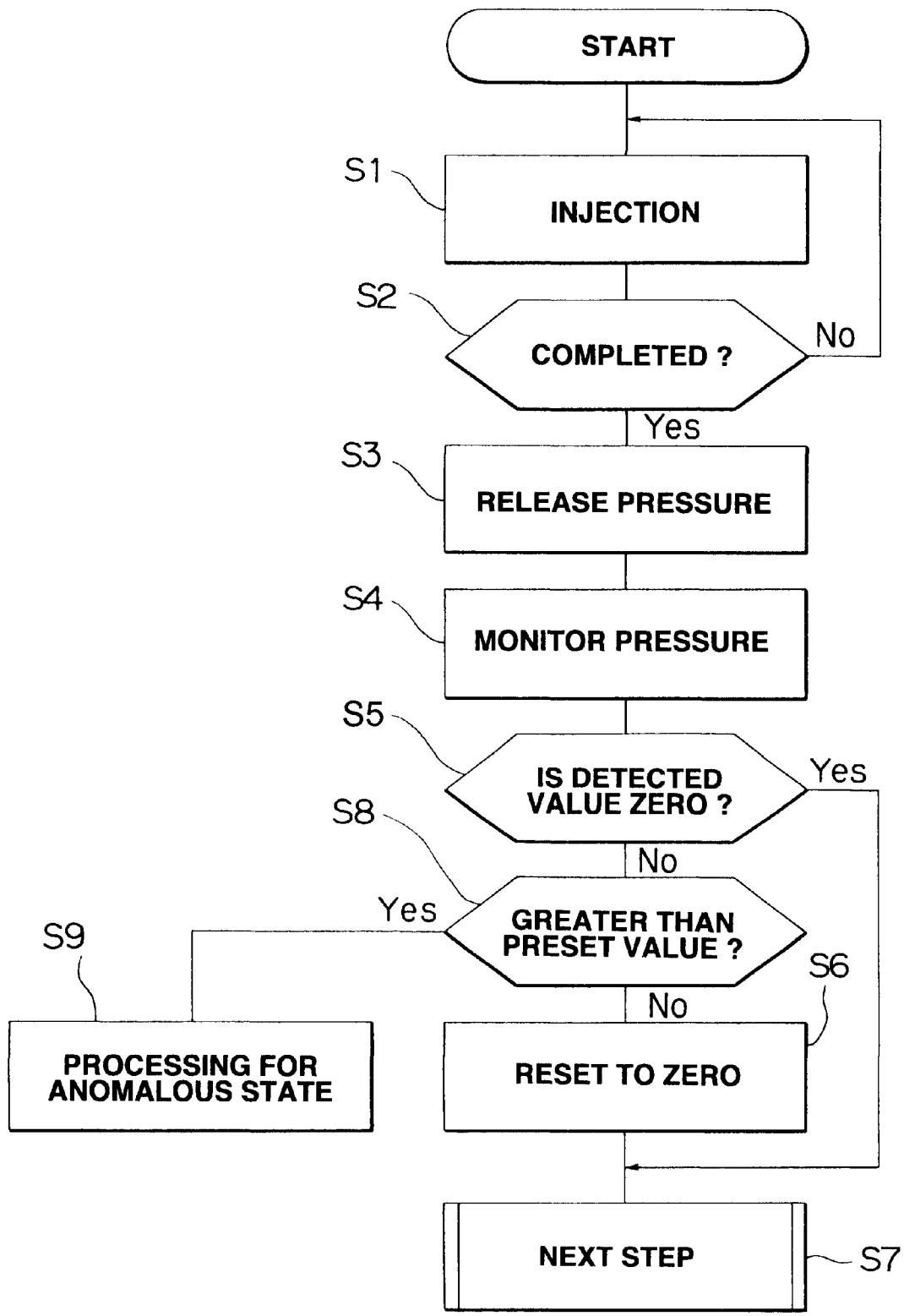
FIG. 8 is a flowchart showing processing performed by the pressure detection apparatus according to the embodiment.

Next, the injecting operation of the injection molding machine M will be described with reference to FIGS. 1 to 7 and according to the flowchart shown in FIG. 8.

The following descriptions starts from the state in which the injection molding machine M has completed a measuring step. Accordingly, the screw 2s is retreated to an injection start position. Upon start of an injection step, the controller 44 causes the servomotor 3 to run, thereby rotating the rotor shaft 62. Rotation of the rotor shaft 62 is transmitted to the ball screw 4s of the ball screw mechanism 4. Rotation of the ball screw 4s causes the nut 4n to advance. As a result, the rear slider 25, to which the nut 4n is attached, the load cell 6, the bearing retainer ring 36, the front slider 24, and the screw coupling 27 advance unitarily. Thus, the screw 2s also advances, thereby injecting a measured amount of resin present ahead of the screw 2s into an unillustrated mold (Step S1).

In the injection step, rotation of low speed and high torque is directly transmitted to the ball screw 4s of the ball screw mechanism 4, thereby drastically enhancing responsiveness of control and accuracy of control and avoiding imposition of unbalanced load on the rotor shaft 62 of the servomotor 3 which would otherwise result from use of a timing belt.

Since the position of the screw 2s and injection speed in the course of advancement of the screw 2s are detected by means of the rotary encoder 78 of high resolution, the position of the screw 2s and injection speed can be controlled at high accuracy.

In the injection step, the nut 4n moves in the direction of arrow Hf shown in FIG. 4. Accordingly, a front end portion of the rear slider 25 is pressed against the inner ring portion 6i of the load cell 6. On the basis of pressure detected by means of the load cell 6, injection pressure and dwell pressure are controlled. Since the rear slider 25 merely abuts the load cell 6 while being mounted on the guide shafts 23, stress (load) directed in a rotational direction and imposed on the nut 4n from the ball screw 4s is born by the rear slider 25 and is not imposed on the load cell 6. Thus, only thrust pressure can be detected at high accuracy. Since the load cell 6 is not designed to connect a screw support member and the ball screw mechanism 4, unnecessary stress is not imposed on the load cell 6, thereby extending the life of the load cell 6.

Upon completion of injection, pressure is released (Steps S2 and S3). In the step of releasing pressure, the drive mechanism 5 is controlled to perform a retreat operation. Thus, the nut 4n moves in the direction of arrow Hr shown in FIG. 5, causing the rear slider 25 to be displaced rearward by the stroke Ls with respect to the load cell 6. As a result, the front end portion of the rear slider 25 is disengaged from the inner ring portion 6i of the load cell 6.

In the course of release of pressure, the controller 44 monitors pressure detected by the load cell 6 as a measured pressure. When the measured pressure differs from the initial value, the measured pressure is reset to the initial value through correction (Steps S4, S5, and S6). Specifically, in the course of release of pressure, the front end portion of the rear slider 25 is disengaged from the inner ring portion 6i of the load cell 6; therefore, pressure imposed on the load cell 6 becomes completely zero. Accordingly, the pressure detected at this time; i.e., the measured pressure, must be zero. However, if the measured pressure is not zero (initial value), the measured pressure is reset to zero through correction. Then, control proceeds to the next step (Step S7).

When the difference between the measured value of pressure and the initial value (zero) is greater than a preset value, it is conceivable that the load cell 6 malfunctions. In this case, processing for an anomalous state is performed; specifically, an alarm lamp is lit, or control is terminated (Steps S8 and S9).

As described above, in the pressure detection apparatus 1 according to the present embodiment, reset-to-zero is performed while pressure imposed on the load cell 6 is completely zero, so that reset-to-zero can always be of high accuracy. Also, when the drive mechanism 5 is controlled to perform a retreat operation, the front end portion of the rear slider 25 is disengaged from the inner ring portion 6i of the load cell 6, thereby preventing imposition of unnecessary stress on the load cell 6 and thus contributing to extension of the life of the load cell 6.

While the present invention has been described with reference to the above embodiment, the present invention is not limited thereto. Regarding structural details, shape, material, quantity, techniques, among others, modifications and any omission or addition may be possible as needed without departing from the scope of the invention. For example, the above embodiment is described while mentioning the screw 2s as an example of the movable member 2. However, the movable member 2 may be a mold-clamping mechanism, an ejector pin, or an injection unit itself. According to the above embodiment, the nut 4n of the ball screw mechanism 4 is fixedly attached to the pressure reception member 8; however, the ball screw 4s may be fixedly attached to the pressure reception member 8. Also, according to the above embodiment, the load cell 6 is fixedly attached to the movable member 2; however, the load cell 6 may be fixedly attached to the pressure reception member 8. Furthermore, according to the above embodiment, the restraining mechanism 9 is attached to the movable member 2; however, the restraining mechanism 9 may be attached to the pressure reception member 8. Also, the above embodiment is described while mentioning the guide shafts 23 serving as the guide member 7. However, the guide member 7 may be guide rails disposed on the machine base 20.

In the present invention, the expression "the rear slider 25 can make a relative displacement with respect to the load cell 6 by a predetermined stroke Ls" means that the front end portion of the rear slider 25 is disengaged from the inner ring portion 6i of the load cell 6 so that pressure imposed on the load cell 6 can be made completely zero. When the front end portion of the rear slider 25 and the inner ring portion 6i of the load cell 6 are not pressed against each other, no pressure is imposed on the load cell 6. Therefore, the predetermined stroke Ls includes "0." Also, the ball screw mechanism includes a so-called roller screw mechanism.

What is claimed is:

1. A pressure detection apparatus of an injection molding machine comprising a drive mechanism, which in turn comprises a drive motor and a ball screw mechanism, and a movable member, which is moved in a reciprocating manner by the drive mechanism, the pressure detection apparatus comprising:

a pressure reception member disposed in the drive mechanism in such a manner as to be movable in a reciprocating direction of the movable member while being guided by a guide member, a ball screw or nut of the ball screw mechanism being fixedly attached to the pressure reception member;

a load cell disposed between the drive mechanism and the movable member, the load cell being fixed to one of a bearing ring retainer facing the movable member and the pressure reception member while abutting the other; and a restraining mechanism disposed between the movable member and the pressure reception member and enabling the pressure reception member to be displaced with respect to the movable member in the reciprocating direction by a distance determined by a length of a guide pipe of the restraining mechanism.

2. A pressure detection apparatus of an injection molding machine according to claim 1, wherein the movable member is a screw of an injection unit.

3. A pressure detection apparatus of an injection molding machine according to claim 1, further comprising a controller which monitors a measured pressure, the measured pressure being a detected value issued from the load cell when the drive mechanism is controlled to retreat from the movable member, and which resets the measured pressure to an initial value through correction when the measured pressure differs from the initial value.

4. A pressure detection apparatus of an injection molding machine according to claim 3, wherein, when the measured pressure is greater than a preset value, the controller performs processing for an anomalous state.

* * * * *